US007284888B2

(12) United States Patent
Pauty et al.

(10) Patent No.: US 7,284,888 B2

(45) Date of Patent: Oct. 23, 2007

(54) MULTIFUNCTION LIGHT DEVICE

(75) Inventors: Etienne Pauty, Bobigny (FR); Benoit Reiss, Bobigny (FR); Boris Weigand, Bobigny (FR)

(73) Assignee: Valeo Vision, Bobigny (FR)

( * ) Notice: Subject to any disclaimer, the term of this patent is extended or adjusted under 35 U.S.C. 154(b) by 77 days.

(21) Appl. No.: 11/149,030

(22) Filed: Jun. 8, 2005

(65) Prior Publication Data

US 2005/0276062 A1 Dec. 15, 2005

(30) Foreign Application Priority Data

Jun. 9, 2004 (FR) .................................. 04 06273
Mar. 25, 2005 (FR) .................................. 05 03009

(51) Int. Cl.
*B60Q 1/00* (2006.01)

(52) U.S. Cl. ........................ 362/539; 362/303; 362/512

(58) Field of Classification Search ................ 362/539, 362/538, 303, 305, 512
See application file for complete search history.

(56) References Cited

U.S. PATENT DOCUMENTS

| | | | | |
|---|---|---|---|---|
| 5,339,226 | A * | 8/1994 | Ishikawa | 362/539 |
| 5,412,543 | A * | 5/1995 | Kobayashi et al. | 362/524 |
| 6,116,764 | A | 9/2000 | Eichhorn et al. | |
| 6,250,790 | B1 * | 6/2001 | Montet | 362/549 |
| 6,623,149 | B2 * | 9/2003 | Leleve | 362/512 |
| 6,796,696 | B2 * | 9/2004 | Taniuchi | 362/539 |
| 6,874,923 | B2 * | 4/2005 | Albou et al. | 362/512 |
| 2002/0044451 | A1 | 4/2002 | Leleve | |
| 2002/0085387 | A1 | 7/2002 | Taniuchi | |
| 2004/0228139 | A1 | 11/2004 | Taniuchi | |
| 2004/0246738 | A1 | 12/2004 | Taniuchi | |
| 2005/0180154 | A1 * | 8/2005 | Albou et al. | 362/514 |

FOREIGN PATENT DOCUMENTS

| | | |
|---|---|---|
| DE | 19643945 | 5/1998 |
| EP | 1068990 | 1/2001 |
| EP | 1197387 | 4/2002 |
| EP | 1213532 A2 | 6/2002 |
| EP | 1213532 A3 | 6/2002 |
| JP | 03171502 | 7/1991 |

OTHER PUBLICATIONS

French Search Report dated Dec. 16, 2004.

* cited by examiner

*Primary Examiner*—Renee Luebke
*Assistant Examiner*—Gunyoung T. Lee
(74) *Attorney, Agent, or Firm*—Morgan & Finnegan LLP

(57) ABSTRACT

The present invention relates to a light device projecting a light beam along a principal lighting axis, by means of at least one light source, the light device also comprising at least one reflector, a frame and a shield. The shield is able to move in rotation about an axis of rotation and has an "active" edge composed of a set of distinct portions, at least part of one of the portions of the said portions taking part in the production of at least two different cutoffs of the light beam emitted by the said light source.

20 Claims, 4 Drawing Sheets

Figure 1:
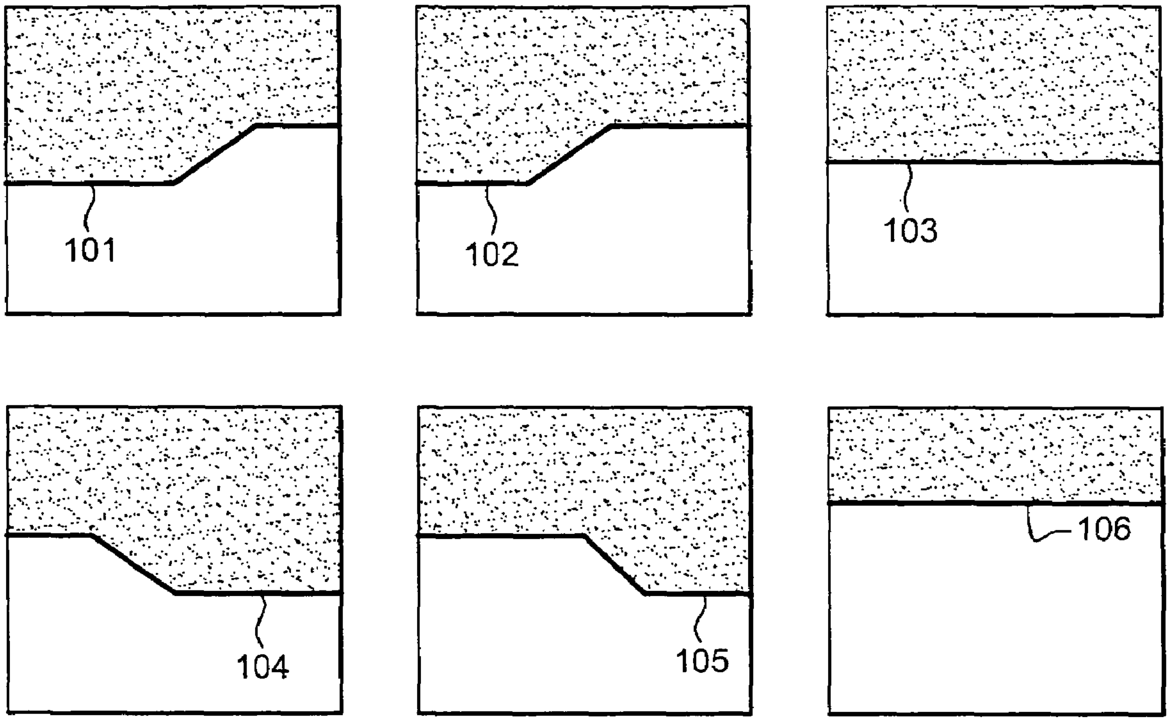

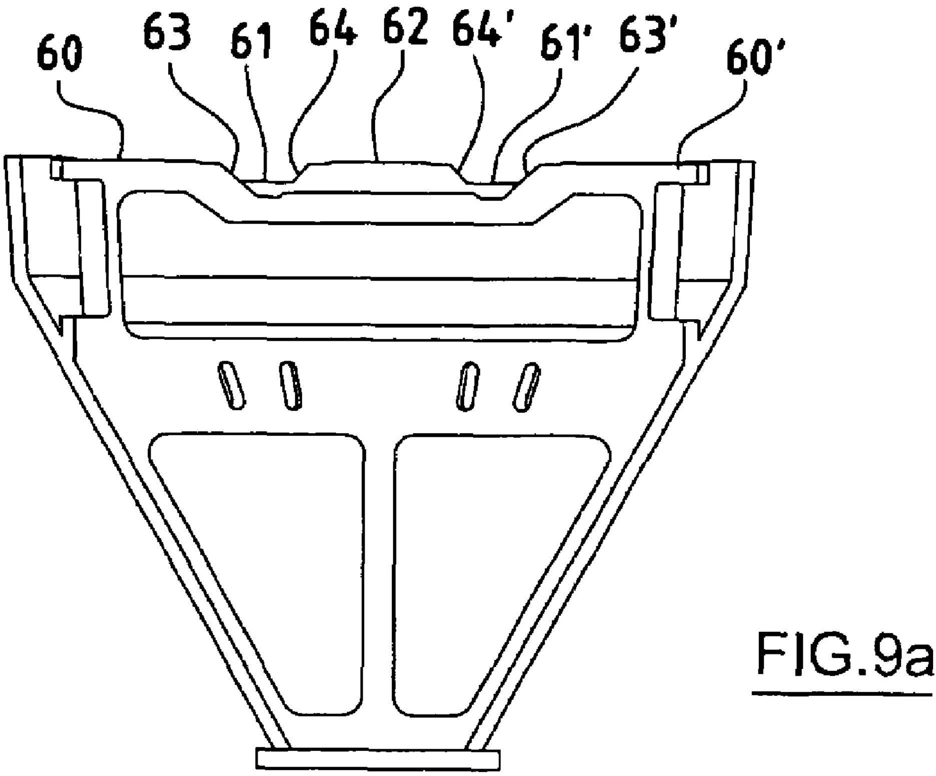
FIG.9a
FIG.9b
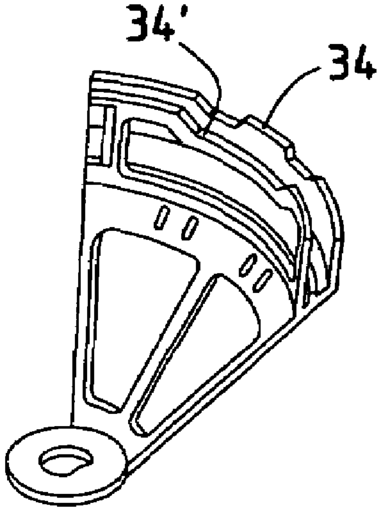

MULTIFUNCTION LIGHT DEVICE

FIELD OF THE INVENTION

The object of the present invention is a multifunction light device, in particular of the elliptical type. In this type of light, a light concentration spot is generated by a light source disposed in a reflector. Typically the light source is disposed at the first focus of a reflector in the form of an ellipsoid, the said spot forming at the second focus of the reflector. The light concentration spot is then projected onto the road by a conversion lens, for example a lens of the planar-convex type.

BACKGROUND OF THE INVENTION

The aim of the invention is essentially to propose a solution for obtaining, from a relatively simple light device of the elliptical type, various light beams corresponding to various cutoff lines satisfying various standards and/or regulations, in particular without having recourse to a multitude of shields.

The field of the invention is, in general terms, that of lighting devices of the motor vehicle light type. In this field, various types of light device are known, amongst which there are essentially:

- side lights, with low intensity and range;
- passing, or dipped-beam, lights, with greater intensity and range on the road of around 70 metres, which are used essentially at night and where the distribution of the light beam is such that it makes it possible not to dazzle the driver of a passing vehicle;
- long-range headlights, and auxiliary lights of the long range type, where the area of vision on the road is around 200 metres, and which must be switched off when passing another vehicle in order not to dazzle its driver;
- fog lights.

In addition, a type of improved light is known, referred to as dual-function lights, which combine the functions of dipped lights and long-range lights: for this purpose, it is possible for example to dispose inside the dual-function light a removable shield consisting for example of a metallic plate, able to move on demand from a first position in which it does not obscure the light beam produced by the light source of the light, the range of the light then corresponding to that of main-beam lights, and a second position in which it obscures part of the light beam produced by the light source of the light, the range of the light then being limited to that of dipped lights. The light must, in the second position, generate a beam with a regulatory cutoff corresponding to a dipped beam, the form of the cutoff being given by the form of the shield intercepting part of the light beam. This type of design is principally used in light devices of the elliptical type.

However, the conventional light devices which have just been mentioned, more particularly those which are used as dipped lights, produce light beams which are open to improvement when these light devices are used in certain conditions.

Thus, when a vehicle is on a motorway, it is judicious to concentrate the light flux of the dipped light at the optical axis of the light device, in order to make the beam produced carry a little further. On the contrary, when a vehicle is travelling in town, it is not necessary to make the light beam carry as far as on clear roads.

Thus, in addition to the conventional main light functions, in particular dipped and main beam, various improvements have progressively appeared. Thus elaborate functions or advanced functions have been seen to develop which slightly modify the positioning of the cutoff of the light beam produced, amongst which there are in particular:

- a function known as Town Light in English, standing for town beam. This function provides a slight reduction in the range of the light device, possibly by providing a broadening of the beam of the dipped beam type;
- a function known as Motorway Light in English, standing for motorway light. This function provides an increase in the range of a dipped light.

In addition, it must be recalled that, for countries where the traffic travels on the right, the cutoff line of a beam of the dipped type is symmetrical, with respect to a vertical central axis, with that observed in countries where the traffic travels on the left. FIG. 1 depicts, by way of example and schematically, four projections on a planar surface of the various light beams that have just been mentioned. The planar projection surface is disposed facing the light device in question, perpendicular to its optical axis. The darkened part of these projections corresponds to an absence of light in this part, the part left white corresponding to a normal illumination by means of the light device in question. Thus there have been shown a first cutoff 101, corresponding to a dipped beam in traffic on the right, a second cutoff 102 corresponding to a motorway beam in traffic on the right, a third cutoff 103 corresponding to a town beam or fog light, a fourth cutoff 104 corresponding to a dipped beam in traffic on the left, a fifth cutoff 105 corresponding to a motorway beam in traffic on the left and a sixth cutoff 106 corresponding to a main beam.

It is therefore sought to propose light devices which are capable of modifying the cutoff of the light beam that they produce, so as to be able to propose alternatively in particular the six beams shown in FIG. 1.

To this end various solutions have been proposed in the prior art.

A first solution, described in the document U.S. Pat. No. 5,673,990, consists of a light device provided with a movable screen for in particular vertical sliding in order to form on demand a beam with a particular cutoff.

A second solution, described in the European patent application EP 1 197 387, describes the use, in each light device of the dipped beam type, of a plate, approximately square in shape, in rotation on itself, the axis of rotation being inclined with respect to a main lighting axis. Each side of the plate makes it possible to obtain a light beam corresponding to a particular cutoff when the side in question is brought, by rotation of the plate, facing the light source of the light device in question.

However, with these two solutions, the changes in position of the screens or movable plates in order to pass from a first beam having a first cutoff to a second beam having a second cutoff take place by means of awkward transition phases with a modification disturbing the light distribution below the cutoff line. Moreover, the first solution requires a particularly complex and high-precision mechanism.

One object of the invention is to respond to all the problems that have just been mentioned. To this end, in the invention, it is proposed to use a shield rotationally moving about a substantially vertical axis, or one inclined with respect to the vertical. Part of the shield terminates in a so-called “active” edge (that is to say the edge which will determine the light/dark limit of the light beam emerging from the light), the shape of which defines the cutoff of the beam of the light device in which the shield is disposed. It is a case generally of the top edge of the shield, "top" having to be understood in the light of the shield mounted in the light in the operating position in the vehicle. In order to be able to offer a large number of distinct cutoffs by means of the same shield moving in rotation, it is proposed, in the invention, that certain sectors of the "active" top part of the shield make their contribution in the production of several cutoffs.

To this end, in the invention, a clever succession of shapes is proposed, defining the active or top edge terminating the shield, so that at least part of one of these shapes can be used in the production of at least two beams, having different cutoffs, preferably corresponding to two consecutive positions of the shield considering the rotation movement of the shield about the vertical axis.

SUMMARY OF THE INVENTION

The invention therefore essentially concerns a light device projecting a light beam along a principal illumination axis by means of at least one light source, the light device also in particular comprising a reflector, a frame and a shield, such that the shield is able to move in rotation about an axis of rotation (in particular a single axis of rotation). In addition, the shield has an active (top) edge composed of a set of distinct portions, at least part of one of the portions of the set of portions acting in the production of at least two different cutoffs of the diffused light beam. Preferably, the axis of rotation of the movable shield is unique. Light device should be taken to mean a set of components able to generate a light beam and intended to be integrated in a lighting device of the motor vehicle light type.

The light device according to the invention can also have, apart from the characteristics stated in the previous paragraph, one or more of the following secondary characteristics:

- the two different cutoffs correspond to a first light beam and to a second light beam, a transition from the first light beam to the second light beam being obtained by rotation of the shield in order to make it pass from a first position to a second position, the first position and the second position being consecutive positions amongst a set of previously determined positions of the shield;
- the shield is able to define, according to its relative position with respect to the frame, at least one of the beams amongst the following group:
  - dipped beam for driving on the right;
  - motorway beam for driving on the right;
  - town or fog beam;
  - motorway beam for driving on the left;
  - dipped beam for driving on the left;
  - main beam;
- the top edge of the shield has successively a first substantially planar area situated at a first level, a second substantially planar area situated at a second level higher than the first level, and a third substantially planar area situated at the first level;
- the "active" edge of the shield has at least two substantially planar areas situated at a first level disposed between at least one substantially planar area disposed at a second level, lower or higher than the first level;
- the "active" edge of the shield has at least one substantially planar area situated at a first level, at least one substantially planar area situated at a second level, and at least one substantially planar area situated at a third level;
- the "active" edge of the shield has at least four substantially planar areas disposed so that two successive areas are at different levels and connected to each other by at least one oblique transition area;
- the "active" edge of the shield has successively a first substantially planar area situated at a first level, a second substantially planar area situated at a second level lower than the first level, a third substantially planar area situated at a third intermediate level, a fourth substantially planar area situated at the second level and a fifth substantially planar area situated at the first level;
- the transition between two successive substantially planar areas having different levels is provided by an oblique area of the top edge of the shield;
- the "active" edge of the shield has for example symmetry with respect to a plane passing through the axis of rotation of the shield;
- a transition between the first planar area and the second planar area, and/or between the second planar area and the third planar area, is provided by a substantially oblique area of the active or top edge of the shield;
- the axis of rotation is substantially vertical; however it may also be (slightly) oblique with respect to the vertical;
- the light device comprises a fixed screen rigidly fixed to the frame;
- the fixed screen is able to cooperate with the shield in order to produce a previously determined light beam of the light device;
- the light device comprises a stepping motor for driving the shield in rotation about its axis of rotation;
- the top or active edge of the shield is supported by a first lug and a second lug both inclined with respect to the axis of rotation, the first lug and the second lug joining at a ring centred on the axis of rotation. Any other mechanical means of holding the active edge of the shield is possible.

"Level" means the relative height of the area in question, the shield in the position of use as depicted in the figures.

- the shield is duplicated at least partially, so as to have at least locally two "active" edges mutually offset with respect to the optical axis. This duplication makes it possible in fact to best correct any problems of iridescence, chromatic aberrations at the cutoff.

In this case, the shield is preferably duplicated so as to have two "active" edges in the active portion or portions in the dipped beam position close to the optical axis. On the other hand, it is possible to have only one active edge for the other functions, particularly in the active areas of the shield close to the optical axis and involved in obtaining a beam of the motorway type. This is because, for a beam of the motorway type, the cutoff is projected further than in the case of a beam of the passing/dipped type and consequently the problems of chromatics close to the cutoff are less or not at all perceptible.

Another object of the invention is a motor vehicle equipped with such a light device.

The invention and its various applications will be better understood from a reading of the following description and an examination of the figures which accompany it. The latter are presented only by way of indication: they are schematic and are in no way limiting of the invention.

Figure 2:
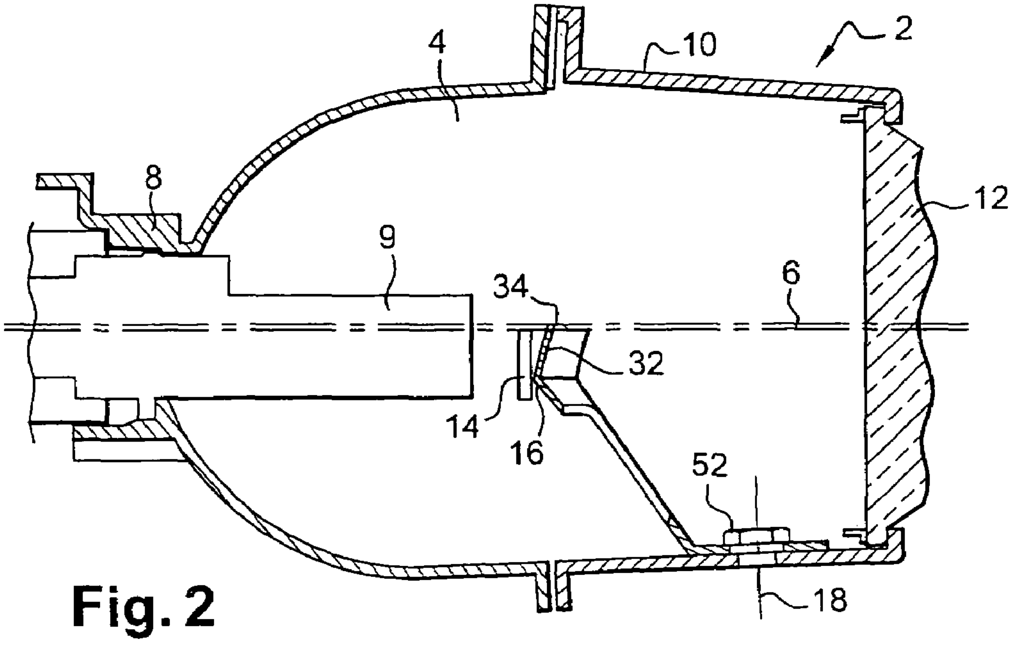
Figure 3:
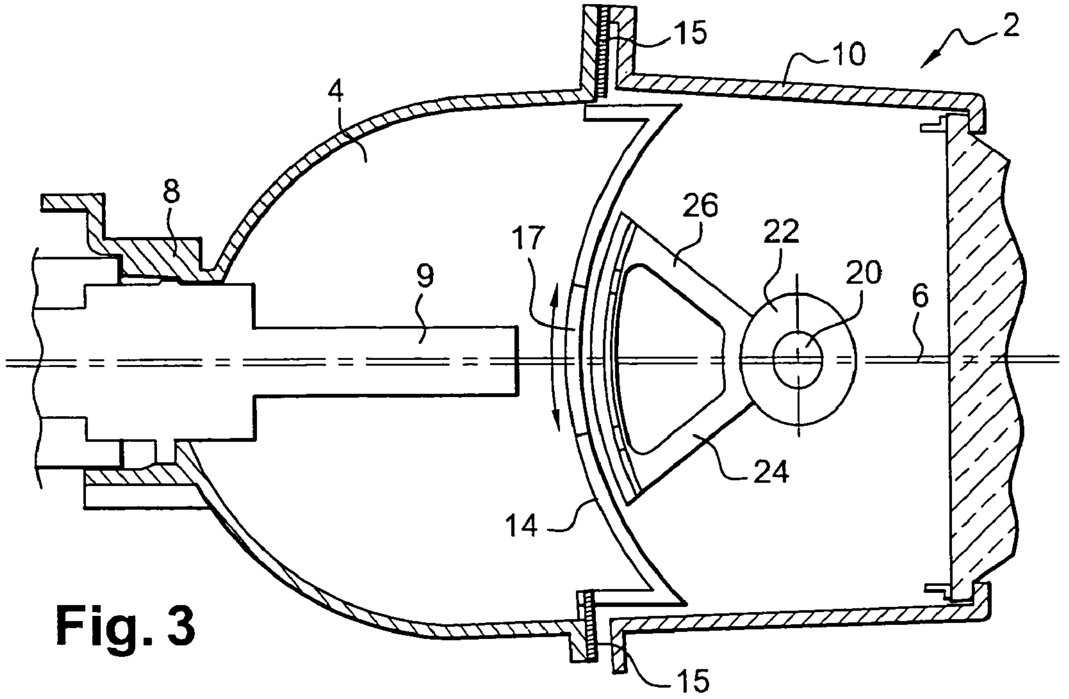
Figure 4:
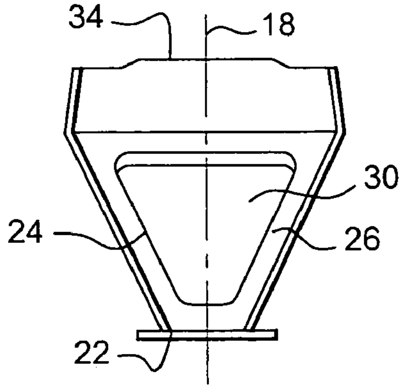
Figure 5:
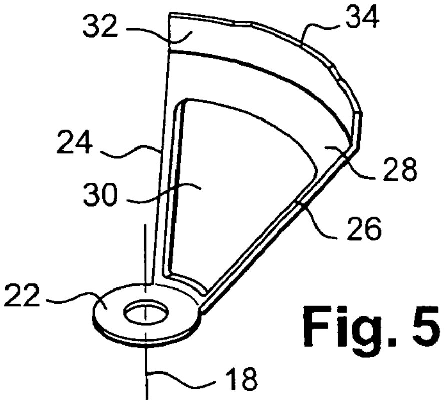
Figure 6:
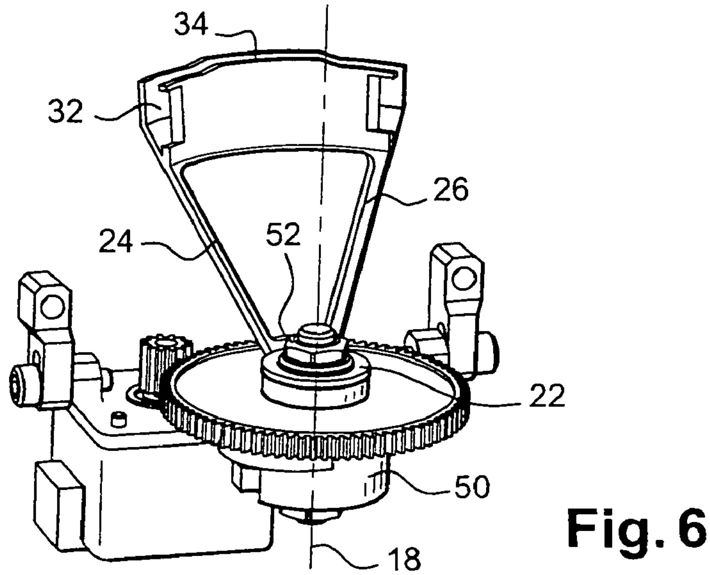
Figure 7:
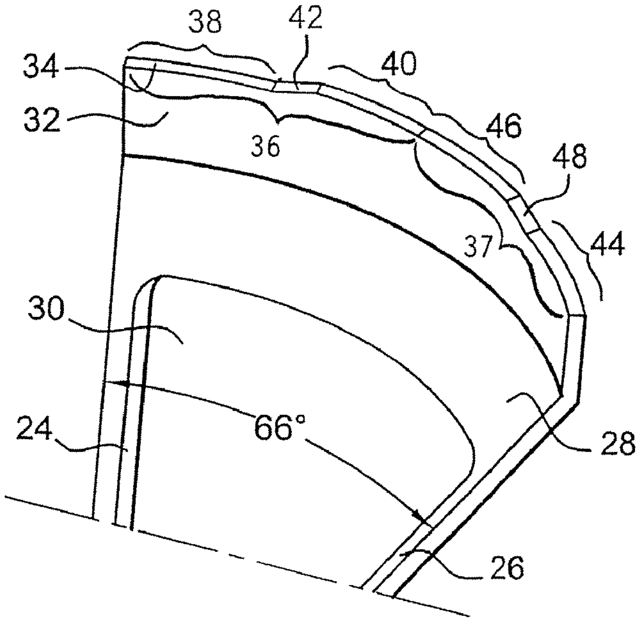
Figure 8:
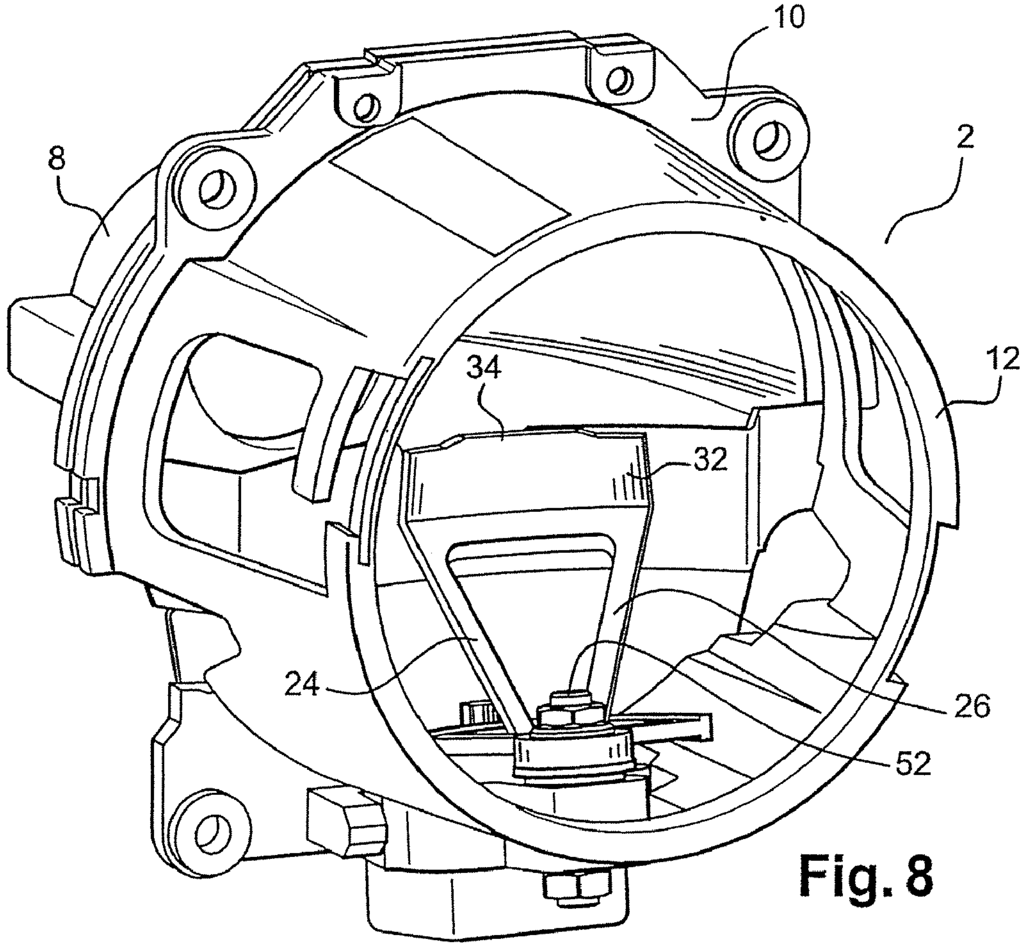

BRIEF DESCRIPTION OF THE DRAWINGS in FIG. 1, already described, a schematic representation of the various light beam cutoffs which can be obtained by virtue of the light device according to the invention;

in FIG. 2, a view in section along a vertical longitudinal plane of an example embodiment of a light device according to the invention;

in FIG. 3, a view in section along a horizontal longitudinal plane of the light device of FIG. 2;

in FIG. 4, a front view of a first example embodiment of a shield acting in the light device according to the invention;

in FIG. 5, a perspective view of the shield of FIG. 4;

in FIG. 6, a schematic representation of the shield of FIGS. 4 and 5 mounted on a motor driving it in rotation;

in FIG. 7, a detailed representation of the form of a top edge of the shield of FIGS. 4 to 6;

in FIG. 8, a perspective view of an example embodiment of the light device according to the invention;

in FIGS. 9*a*-9*b*, a schematic representation of the shield according to the invention in accordance with a second example.

DESCRIPTION OF THE PREFERRED EMBODIMENTS

The elements appearing in different figures keep the same references.

The first example depicted, in different views and, according to the figure, in greater or lesser detail, shows a light device 2 according to the invention; it comprises a light source 9 producing a light beam, a reflector 4, part of which provides a concentration of light in the vicinity of the screen, for example in the form essentially of an ellipsoid. The horizontal longitudinal axis 6 forms a principal lighting direction, or optical axis, of the light. The light comprises a lamp holder 8 fixed to the reflector 4 at the rear part thereof, a lens holder 10 fixed at the front part of the reflector, and a lens 12 fixed at the front part of the lens holder 12, a focal plane of the lens passing in the vicinity of a second focus of the reflector. The lamp holder 8, the reflector 4, the lens holder 10 and the lens 12 follow each other along the axis 6. The reflector 4 and the lens holder 10 constitute a frame of the light device 2, which may also comprise a housing enclosing all the elements that have just been mentioned.

The light device 2 comprises a screen 14, rigidly fixed to the frame. The screen 14 has a curved shape, with a substantially cylindrical cross-section with a vertical generatrix and a centre of curvature situated towards the front of the light. The screen 14 extends vertically over a low height and horizontally over approximately the entire width of the reflector 4. It has a horizontal top end extending, on each side of the axis 6, at 0.5% below the axis 6, with reference to the focus of the lens 2. At the axis 6, the top end of the screen 14 has a recess 17, visible in FIG. 3, approximately one centimeter deep, and over a portion of the top end corresponding to an angle of approximately 30°, the top end describing a shape that can be assimilated to an arc and a circle. The screen is fixed by two lateral lugs 15 gripped between the edges of the reflector 4 and lamp holder 8. It prevents any risk of dazzling of a driver passed during the movement of a movable shield 16 about a substantially vertical axis of rotation 18. The shield 16 is, during its rotation, caused to pass in front of the recess 17, and to fill it in in the majority of positions, which will be detailed below, that can be adopted by the shield 16.

The shield 16 comprises, in the example described, a ring 22 forming a base of the shield 16, centred on the axis of rotation 18 and having a central opening 20; a first lug 24 and a second lug 26, fixed to the ring 22, move away from a base plane defined by the ring, for example at an angle of between 40° and 50° with respect to this base plane. The two lugs 24 and 26 are joined at a first end at the ring 22 and at a second end by means of a support element 28, approximately contained in a plane defined by the two lugs 24 and 26. The latter therefore leave an empty space 30 between them. Their separation is for example between 60° and 70°; in a particular example, it is 66°.

The support element 28 is extended by a top part 32, curved, and substantially vertical, or having, as shown in FIG. 1, an angle of between 5° and 10° with respect to the axis 18. The top part is curved in order to be able to move in rotation along the screen 14. The top part 32 terminates, at its free end, in a top edge 34, the shape of which defines the curvature, and therefore the nature of the light beam, obtained by means of the light device in question.

The shape of the top edge 34 is more particularly detailed in FIG. 7. In this example, the top edge 34 consists of a first portion 36, situated on the left hand part of the top edge 34, and a second portion 37 situated on the right hand part of the top edge 34.

The first portion 36 and second portion 37 do not overlap but follow each other directly on the top edge 34. The first portion 36 has, starting from the left hand end of the top edge 34, successively a first planar area 38 situated at a first level, and a second planar area 40 situated at a second level higher than the first level, a first oblique area 42 providing the transition between the first planar area 38 and the second planar area 40. The second portion 37 has, starting from the right hand end of the top edge 34, successively a first planar area 44 situated at the first level and, in line with the second planar area 40 of this first portion 36, a second planar area 46 situated at the second level, a second oblique area 48 providing the transition between the first planar area 44 and the second planar area 46.

Each of the portions 36 and 37 describes a first measuring curve with an angle of approximately 30° considering that the top edge describes a shape that can be assimilated to an arc of a circle. Thus, when one of the portions is brought, by rotation about the axis 18, opposite the recess 17, it creates a cutoff line which is peculiar to it.

In the example shown, if there is adopted as the central position of the shield a position in which the junction point between the area 40 and the area 47 is placed opposite a central position of the recess 17, it is possible to obtain the following different light beams:

- central position: flat cutoff beam 103, the dimension of the areas 40 and 46 being sufficient to fill in in length the entire recess 17;
- rotation of 13.5° approximately about the axis 18: motorway beam in right hand traffic 102, a small part of the area 40 and a large part of the portion 37 filling in in length the entire recess 17;
- rotation of 15° approximately about the axis 18: beam for traffic on the right 101, the portion 37 filling in in length the entire recess 17;
- rotation of −13.5° approximately about the axis 18: motorway beam for traffic on the left 105, a small part of the area 46 and a large part of the portion 36 filling in in length the entire recess 17;
- rotation of −15° approximately about the axis 18: beam for traffic on the left 104, the portion 36 filling in in length the entire recess 17;

rotation greater than approximately 30°, or less than approximately 30° about the axis 18: main beam; it is noted that, in the example according to the invention, there are therefore two distinct positions of the shield 16 for obtaining a main beam; the latter is therefore directly accessible, without passing through intermediate steps corresponding to other beams, whether the shield be positioned in a traffic on the left or traffic on the right configuration.

It is found that, by virtue of the clever succession of the areas 38, 40, 44 and 46, up to six distinct beams are obtained by virtue of the shield 16, which is also of small size, and whose movement takes place simply about the single axis of rotation 18. As could be understood in the enumeration of the various possible positions of the shield, certain areas, and even certain parts of the areas constituting the portions 36 and 37, take part in the achievement of several cutoffs, and therefore in the production of several light beams.

In one example embodiment, the shield 16 is driven in rotation by an actuator, for example a motor of the stepping motor type 50 visible in FIG. 6, comprising for example 96 steps. The motor can be disposed inside the light device, or under the lens holder 10. It is held by means of a fixing system involving for example a nut 52. Its functioning is managed by a microcontroller, in which particular positions of the shield 16 have been stored in advance, in particular the six positions that have just been described. The positioning of the shield 16 in one of the previously stored memories can be controlled by the driver from the vehicle dashboard.

FIGS. 9*a*-9*b* correspond to a second embodiment of a shield according to the invention, in front view and side view.

As depicted in FIG. 9*a*, this shield has an active edge profile composed of two planar areas 60, 60' at an upper level end 2, disposed between two planar areas 61, 61' disposed at an intermediate level n1, themselves disposed on each side of a planar area 62 disposed at a lower level n0. In addition, two successive planar areas are connected to each other by an oblique area, as in the first example: the areas 63, 63' between each area 60, 60' and 61, 61' and the areas 64, 64' between the areas 61, 61' and the area 62.

By adopting as the central position of this shield a position in which the edge 62 is placed opposite a central position of the recess 17, it is possible to obtain with this shield the following various light beams:

- rotation by approximately 10° to the right about the axis 18: motorway beam in right hand traffic 102, a small part of the area 62 and a large part of the portions 61 and 60 filling in in length the entire recess 17;
- rotation by approximately 21° to the left about the axis 18: right hand traffic 101, the portions 62, 61' and 60' filling in in length the entire recess 17;
- rotation by approximately 20° to the left about the axis 18: motorway beam in left hand traffic 105, a small part of the area 62 and a large part of the portions 61' and 60' filling in in length the entire recess 17;
- rotation by approximately 21° to the right about the axis 18: beam for traffic on the left 104, and the portions 62, 61 and 60 filling in in length the entire recess 17;
- rotation by more than approximately 72° towards the left, or less than approximately 72° towards the right about the axis 18: main beam.

This shield is in particular advantageous in the "motorway" position, making it possible to reduce any risk of dazzling of the driver coming in the opposite direction.

FIG. 9*b* makes it possible to distinguish another particularity of the shield according to the second example: the shield 16 has locally not one active edge 34 but two, 34 and 34', offset with respect to the optical axis 18 and having identical profiles. These are more particularly the areas 60, 61, 63, 60', 61', 63' which are duplicated, whilst the areas 64, 64' and 62 are not duplicated. In concrete terms, the edge 34' in the non-duplicated areas has an edge at a sufficiently low level to become inactive optically whilst ensuring the mechanical continuity of the edge 34'. It can be seen that the active edge 34 is placed after the duplicated edge 34' relative to the direction of the light coming from the source associated with the reflector. The choice of duplicating the shield reduces any problems of iridescence at the cutoff. The choice of duplicating only certain portions of the shield stems from the observation that it is particularly for beams of the dipped/passing type that any phenomena of chromatic aberrations are more of a nuisance, since the cutoff is projected at a relatively short distance from the vehicle. However, the situation is different with a beam of the motorway type, where the cutoff is projected further, and any iridescence is less perceptible. Thus only the areas close to the optical axis are duplicated (where the light flux is the greatest) and in the active areas of the shield used for dipped beam. It would also be possible to choose to duplicate the entire shield.

The invention thus makes it possible to adapt a shield according to the number and form of the cutoffs required, whilst keeping efficacy, compactness and ease of passing from one cutoff to another, without visual nuisance either for the driver or for the driver of the car arriving in the opposite direction on a road.

What is claimed is:

1. A light device for projecting a light beam along a principal optical axis comprising:

at least one light source, at least one reflector comprising a frame disposed about said at least one light source for reflecting light from said light source to a shield, said shield is movable about an axis of rotation, said shield including a single active edge having at least two sets of a plurality of distinct portions for producing a plurality of distinct cutoffs for light from said light source, a first set of said at least two sets of said plurality of distinct portions being linearly connected to a second set of said at least two sets of said plurality of distinct portions on a same side of said single active edge, said first set being involved in a production of at least a first cutoff, and said second set being involved in a production of at least a second distinct cutoff.

2. The light device according to claim 1, wherein said at least two sets of said plurality of distinct portions correspond to at least a first light beam and at least a second light beam, a transition from the first light beam to the second light beam being obtained by rotation of said shield from at least a first position to at least a second position.

3. A light device according to claim 1, wherein said shield defines, according to a relative position of said shield with respect to said frame, at least one beam amongst the following group: dipped beam for driving on a right side of a road; a motorway beam for driving on a right side of a road; a town beam, a fog beam; a motorway beam for driving on a left side of a road; a dipped beam for driving on a left side of a road; or a main beam.

4. The light device according to claim 1, wherein the active edge has at least a first distinct portion of said plurality of distinct portions comprising a substantially planar area disposed at a first level and at least a second distinct portion of said plurality of distinct portions comprising a substantially planar area disposed at a second level that is different than said first level.

5. The light device according to claim 4, wherein the active edge further includes a third distinct portion of said plurality of distinct portions comprising a substantially planar area situated at said first level.

6. The light device according to claim 5, wherein a fourth distinct portion of said plurality of distinct portions comprising a transition between said first distinct portion and the second distinct portion, or between said second distinct portion and said third distinct portion, said fourth transition comprising an oblique area.

7. The light device according to claim 4, wherein said active edge includes a third distinct portion comprising a transition between two successive distinct portions of said plurality of distinct portions disposed at different levels, said transition is an oblique.

8. The light device according to claim 1, wherein the active edge has at least a first distinct portion of said plurality of substantially planar area situated at a first level, at least a second distinct portion of said plurality of distinct portions comprising a substantially planar area situated at a second level and at least a third distinct portion of said plurality of distinct portions comprising a substantially planar area situated at a third level.

9. The light device according to claim 8, wherein said third level comprising an intermediate level, said active edge also includes a fourth distinct portion of said plurality of distinct portions comprising a substantially planar area situated at said second level, and a fifth distinct portion of said plurality of distinct portions comprising a substantially planar area situated at said first level.

10. The light device according to claim 1, wherein the active edge has at least four distinct portions of said plurality of distinct portions comprising substantially planar areas disposed so that two successive areas of said at least four distinct portions are at different levels and connected to each other by at least another distinct portion of said plurality of distinct portions comprising an oblique transition area.

11. The light device according to claim 1, wherein the active edge is symmetrical with respect to a plane passing through said axis of rotation of said shield.

12. The light device according to claim 1, wherein at least two of said at least two sets of said plurality of distinct portions are mutually offset from one another with respect to said optical axis.

13. The light device according to claim 1, wherein said at least two sets of said plurality of distinct portions include a dipped beam position in a vicinity of said optical axis.

14. The light device according to claim 1, wherein said axis of rotation is substantially vertical or inclined with respect to vertical.

15. The light device according to claim 1, further comprising a fixed screen rigidly fixed to said frame.

16. The light device according to claim 15, wherein said fixed screen cooperates with said shield for producing a previously determined light beam.

17. The light device according to claim 1, further comprising a stepping motor for rotationally driving said shield about said axis of rotation.

18. The light device according to claim 1, wherein said shield is supported by a first lug and a second lug inclined with respect to said axis of rotation, the first lug and the second lug joining at a ring centred on said axis of rotation.

19. A motor vehicle equipped with a light device according to claim 1.

20. The light device according to claim 1, wherein said axis of rotation about which said shield is movable is substantially vertical.

* * * * *